United States Patent [19]

Farago

[11] Patent Number: 4,972,470

[45] Date of Patent: Nov. 20, 1990

[54] PROGRAMMABLE CONNECTOR

[76] Inventor: Steven Farago, 171 Forest Dr., Mount Kisco, N.Y. 10549

[21] Appl. No.: 83,258

[22] Filed: Aug. 6, 1987

[51] Int. Cl.$^5$ ............................................... H04L 9/00
[52] U.S. Cl. .......................................... 380/3; 380/52; 310/71; 439/189; 364/240.8
[58] Field of Search ....................... 380/3, 52; 310/71; 439/189; 364/240.8

[56] References Cited

U.S. PATENT DOCUMENTS

| | | | |
|---|---|---|---|
| 4,509,113 | 4/1985 | Heath | 364/200 |
| 4,689,023 | 8/1987 | Strong et al. | 310/71 |
| 4,691,350 | 9/1987 | Kleijne et al. | 380/3 |
| 4,691,355 | 9/1987 | Wirstrom et al. | 380/23 |
| 4,694,492 | 9/1987 | Wirstrom et al. | 380/23 |

Primary Examiner—Thomas H. Tarcza
Assistant Examiner—David Cain
Attorney, Agent, or Firm—Israel Nissenbaum

[57] ABSTRACT

A configurable connector between two or more devices with at least one of the devices being capable of programming the connector through an interface therewith. The connector contains programmable electronic circuitry capable of being instructed by the device whereby the connector assumes a desired connecting configuration and/or function. In one embodiment the connector is programmed to inquire and determine the configuration of the device to which it is connected. With the results of its analysis the connector adapts the necessary timing, pin-outs, voltages, and other parameters to assure proper communication between the connected devices. In other embodiments the connector contains electronic components to add specific functions for data exchange, such as data buffering, data encryption and the like. In addition, the connector is programmable with interchangeable pin designations thereby obviating the need for rewiring for different applications and physical connections.

13 Claims, 4 Drawing Sheets

PROGRAMMABLE CONNECTOR

This invention relates to connectors between devices for the transfer of information therebetween and in particular to the interconnection of computer devices to peripheral devices.

In U.S. Pat. No. 4,603,320, issued on July 29, 1986 and copending application no. 891,190, filed July 28, 1986, a "smart" connector was disclosed wherein the connector contained, within the housing thereof, the requisite electronic circuitry for providing a data conversion between two or more interfaced devices. Such conversions included a conversion between parallel and serial and between analog and digital data formats. These connectors were however limited to a single hard wired-in conversion application. Thus, while they provided an improvement over the common simple electrical current connectors, they were nevertheless limited to a single operative function.

It is an object of the present invention to provide a connector between devices which is capable of being externally programmed or instructed to adapt itself into a desired connecting configuration and/or function between the devices.

It is a further object of the present invention to provide a connector which, when externally activated, is programmed to inquire and determine the requisite connecting function and to reconfigure itself accordingly.

These and other objects, features and advantages of the present invention will become more evident from the following discussion and drawings in which:

FIG. 1 schematically depicts the internal components of a programmable connector in accordance with the present invention;

FIG. 2 is a block diagram showing the program/configuration supplied to the device of FIG. 1; and FIGS. 3a–b are block diagrams showing specific programmable connector functions.

Generally the present invention comprises a connector having a housing which contains at least two physical interface connection elements such as electrical pins and socket connections, through the walls thereof, for connection to at least two external devices. The connector further contains, within the housing thereof, programmable means remotely accessible by at least one of said devices whereby instructions are sent to the programmable means whereby the function or configuration of the connector is changed thereby as desired. The programmable means is preferably a general purpose electrical circuitry with or without the ability to erase and reprogram it. The loaded program determines the specific function of the connector and the programming can be performed in several ways. For example, the connector may be one-time programmed. In another embodiment the connector is electrically programmed and later erased for reconfiguration. If desired, the program is either downloaded at every power-on cycle, or reconfigured "on the fly".

A significant feature is the ability of the programmable connector of the present invention to inquire and determine the characteristics of the interfaced devices whereby intelligent firmware can find the right connection without cable swapping or rewiring. In addition, the connector automatically adapts the necessary timing, voltages etc. to ensure a proper connection. A suitable algorithm is incorporated or downloaded and stored in a non-volatile manner such as an EPROM or by battery backed RAM. In such embodiments a microprocessor with EPROM is located within the connector housing with the EPROM (or factory programmed mask prom/rom) containing the program that performs the desired interface function. Different programs in the EPROM result in different interface functions. Alternatively, there is a programmable logic array inside the connector housing which is for example, one time programmed (PLA) or is RAM based. The RAM based method results in flexibility with the connector being capable of being configured and reconfigured by a simple instruction for changing protocol, parameters or pin-outs. In some embodiments, the external device such as a computer provides for an input means such as a keyboard or a downloading from a storage device which accesses the connector and instructs it to assume the requisite interface function and/or configuration. In other embodiments the connector is programmed to conduct its own inquiries regarding the nature of the connection interface and adapt itself accordingly. In such embodiments the simple act of powering on is considered herein to be an initiation instruction.

Examples of interfaced devices through which interface instructions may be transmitted to the connector include the aforementioned computer with peripheral input devices. Other commonly interfaced devices include modems, printers and the like to which a transmission of data is required. Data input peripherals for such devices as well as hard wired controls can be utilized in properly instructing the connector to assume the requisite interface function and/or configuration.

It is understood that while the functions of pins of a specific interface can be programmed, according to the present invention, to assume a desired electrical connection configuration, the physical characteristics remain unchanged.

In accordance with the present invention several features are embodied within the connector. A programmable and/or configurable device is contained within the housing of the connector. The configurable device is supplied with a program and/or configuration, with the device and the supplied program and/or configuration, performing a specific predetermined function inside the connector. Different programs and/or configurations result in different functions being performed or executed by the connector.

Programmable and/or configurable electronic devices suitable for use within the connector of the present invention include microprocessor chips with program storage memory. Examples of such chips include the Intel 8035, 8049 and 8031 designated chips. The Intel 2764 Eprom is an example of the program storage memory.

A further example of such programmable and/or configurable electronic devices is a microcontroller with downloadable code storage e.g. the Intel 8031 with an 8k x 8 static RAM memory and the Hitachi HM 2-62256. Other examples include programmable array logic (e.g. MMI LCA ZPAL20L8), custom gate array, programmable logic cell array (e.g. XILINK XC-2064 or 2018, MMI LCA M-2064) and erasable programmable logic device (e.g. ALTERA EP-1210 and 1280, and INTEL 5C180).

Various means may be utilized to supply the program or configuration to the programmable or configurable devices. For example, a custom mask is programmed at the manufacturing site and configured into silicon during wafer fabrication (ROM principle). Alternatively, the programmable and/or configurable electronic device is one time programmable at the user level by utilizing the fusible link programming method. EPROM technology, as embodied in the 2764 Eprom or Altera EP-1210 parts, is utilizable for electrically programmable and u.v. light erasable devices. A further example is a RAM based configuration storage with downloadable feature, such as the XILINX XC-2064 and the 8031 micro plus 6264 Static RAM. In order to maintain a non-volatile program/configuration an alternative battery backup storage device such as is available from Dallas Semiconductor may be utilized.

Various specific, predetermined programmable functions of the programmable connector of the present invention include:

(a) a user programmable port interface, e.g. serial, parallel, etc;

(b) adaptive pin arrangement via software algorithm and hardware switching network of an input-output structure with the connected device and an algorithm to configure the connector to match the network;

(c) a buffered port interface with the connector providing temporary storage of data to accommodate devices operating at different speeds; and (d) a data encryption device incorporated in the connector to provide higher levels of security during data transfer.

In accordance with the present invention, different programs installed in the connector can result in different functions of the connector. For example the connector may function as a reconfigurable port whereby one physical hardware interface can change configuration with the same port becoming an RS-232, RS-422, RS-485 protocol or it can even become a Centronic interface. Such configurations and reconfigurations are accomplished by downloading the proper configuration into the programmable connector as desired.

With specific reference to the drawings, FIG. 1 depicts a pin configurable programmable interface connector 10 with housing 7 in which are contained a general purpose bus interface 11 extending through one wall of housing 7 and a second dedicated port 18 with an adaptive pin configuration. As schematically depicted in FIG. 2, connector housing 7 further contains a data conversion processor 12 having a data interface with custom switching network 14 with line drivers and receivers which, in turn, are interfaced with the connector pins 18. Microcontroller 15 provides switching commands to the switching network 14 and conversion commands to the data conversion processor 12 and receives line sensor signals from the switching network. Microchip 16 contains an EPROM (e.g. 2764 Eprom) or (6264 Static RAM) RAM to provide the requisite programmed and programmable commands.

FIG. 3a schematically depicts the electronic configuration of a printer buffer 20 within a connector housing 27. A logic cell array 22 (XILINX XC-2064) receives data and control commands from a connected device such as a computer with an input device such as a keyboard or storage element such as a disk drive (not shown), through connections 21a and 21b respectively of the general purpose bus interface 21. The logic cell array is in turn linked with a 32k x 8 RAM chip 26 (Hitachi HM-62256 type) which it addresses and sends to and receives data from. The logic cell array sends signals to a buffered printer output 24, via line drivers 23, which is in turn connected to the printer for the desired output. A flow control 29 is interfaced between the connector output 24 and the logic cell array 22. In such embodiment the connector may similarly function as a buffer element between a printer and a data transmitting modem. The logic cell array 22 is configured at every "power-up" sequence via the general purpose bus interface 21 to perform the printer buffer function. The configuration accomplishes a hardware data-control path which is responsible for the desired buffering feature.

FIG. 3b further schematically depicts a pin configurable programmable connector interface device 30. A connector housing 37 contains a general purpose bus interface 31 and a 25 pin "D" connector 38 with a dedicated port for connection to external devices. A microprocessor 32 (Intel 8035) sends and receives commands through bus interface 31 and is in turn electrically connected to line drivers and receivers 33. EPROM 36 (2764 Eprom) provides the requisite program for the microprocessor 32 to execute. Voltage converter (+10 V) 35 provides power for line drivers and receivers 33 and oscillator 38 povides the timing for the microprocessor 32. The interface behavior of the connector 30 is dependent upon the program being executed by microprocessor 32. Thus, EPROM 36 can provide a protocol selection program whereby different connection protocols may be selected for a single connector such as serial, and various serial interface standards such as RS-232, RS-422, RS-485, or even a Centronics parallel interface, etc. for a completely compatible connection between interfaced devices. In a particularly useful embodiment, as data is transmitted through the connector, generally from a computer to a modem for retransmission over communication lines, the program causes the data to be encrypted for secured transmission. With a similarly programmed connector at the receiving end, the data is translated into usable form.

It is understood that the above description and drawings are illustrative of the present invention and details contained therein are not to be construed as limitations on the present invention. Variations in programs, components and structural configurations and the like may be made without departing from the scope of the present invention as defined in the following claims.

What is claimed is:

1. An electronically configurable connector, for connecting at least two discrete external electronic devices, said devices having individual housings and said connector having its own housing which contains at least two physical interface connection elements through the walls thereof, wherein, with the connection of one of the physical interface connection elements with a first one of said devices, at least one other of the physical interface connection elements is exposed externally to said first one of said devices for physical electrical connection with another of said devices; characterized in that said devices, when initially physically connected by said connector, do not electronically communicate with each other as desired; and wherein the connector further comprises electrically programmable means, comprising electronic circuitry with a loaded program, said electronic circuitry being remotely accessible by at least one of said connected devices whereby electrical instructions are sent thereto for interpretation by the loaded program, with operational instructions being generated, whereby the electronic circuitry causes modification of the connection between the connected devices to provide the function or configuration of the connector for communication between the connected devices as desired.

2. The connector of claim 1 wherein said programmable electrically means, after receiving said electrical instructions, causes said connector to function as a printer buffer between a printer, which comprises one of said external devices, and a data transmission device which comprises another of said external devices.

3. The connector of claim 2 wherein said data transmission device comprises a computer.

4. The connector of claim 2 wherein said data transmission device comprises a modem.

5. The connector of claim 1 wherein said electrically programmable means, after receiving said electrical instructions, causes said connector to function as an encryption device for data transmitted between said external devices.

6. The connector of claim 1 wherein at least one of said physical interface connection elements comprises multiple pin outputs and wherein said electrically programmable means, after receiving said electrical instructions, causes said connector to electrically reconfigure itself between said physical interface connection elements whereby the configuration of said multiple pin outputs is reconfigured as desired.

7. The connector of claim 1 wherein said electrically programmable means comprises a microprocessor with program storage memory.

8. The connector of claim 1 wherein said electrically programmable means comprises a microcontroller with downloadable code storage.

9. The connector of claim 1 wherein said electrically programmable means comprises a programmable array logic.

10. The connector of claim 1 wherein said electrically programmable means comprises a custom gate array.

11. The connector of claim 1 wherein said electrically programmable means comprises a programmable logic cell array.

12. The connector of claim 1 wherein said electrically programmable means comprises an erasable programmable logic device.

13. The connector of claim 1 wherein the connector and its housing are external to all of the connected devices.

* * * * *

US004972470C1

(12) EX PARTE REEXAMINATION CERTIFICATE (5028th)

United States Patent
Farago

(10) Number: US 4,972,470 C1
(45) Certificate Issued: Nov. 30, 2004

(54) PROGRAMMABLE CONNECTOR

(75) Inventor: Steven Farago, Mount Kisco, NY (US)

(73) Assignee: Acticon Technologies LLC, Monsey, NY (US)

Reexamination Request:
No. 90/006,859, Nov. 10, 2003

Reexamination Certificate for:
Patent No.: 4,972,470
Issued: Nov. 20, 1990
Appl. No.: 07/083,258
Filed: Aug. 6, 1987

(51) Int. Cl.[7] ................................................ H04L 9/00
(52) U.S. Cl. .......................... 713/192; 310/71; 380/266
(58) Field of Search ........................... 710/2, 8, 11, 14, 710/62, 63, 70, 71; 380/52, 266; 439/189, 955; 341/100, 101; 370/366; 713/192

(56) References Cited

U.S. PATENT DOCUMENTS

| | | |
|---|---|---|
| 3,327,174 A | 6/1967 | Barre et al. |
| 3,395,400 A | 7/1968 | De Witt et al. |
| 3,406,368 A | 10/1968 | Curran |
| 3,408,612 A | 10/1968 | Bute et al. |
| 3,437,882 A | 4/1969 | Cayzer |
| 3,573,799 A | 4/1971 | Drinnai et al. |
| 3,643,135 A | 2/1972 | Devore et al. |
| 3,646,573 A | 2/1972 | Holmes, Jr. |
| 3,790,858 A | 2/1974 | Brancaleone et al. |
| 3,863,226 A | 1/1975 | Ryburn |
| 3,903,404 A | 9/1975 | Beall et al. |
| 3,946,379 A | 3/1976 | Lippman |
| 3,997,879 A | 12/1976 | Markley et al. |
| 4,023,144 A | 5/1977 | Koenig |
| 4,024,505 A | 5/1977 | Sperling |
| 4,031,371 A | 6/1977 | DeVries |
| 4,034,346 A | 7/1977 | Hostein |
| 4,038,642 A | 7/1977 | Bouknecht et al. |
| 4,048,673 A | 9/1977 | Hendrie et al. |
| 4,053,950 A | 10/1977 | Bourke et al. |
| 4,054,947 A | 10/1977 | Shanks et al. |
| 4,065,662 A | 12/1977 | Garczynski et al. |

(List continued on next page.)

FOREIGN PATENT DOCUMENTS

| | | | | |
|---|---|---|---|---|
| EP | 0077657 | * | 4/1983 | ............. G06F/3/04 |
| EP | 0157113 | | 9/1985 | |
| EP | 0206259 | * | 12/1986 | ........... G06F/13/10 |
| GB | 2130025 | | 5/1984 | |
| GB | 2130818 | | 6/1984 | |
| JP | 56061856 | | 5/1981 | |
| JP | 57087255 | | 5/1982 | |
| JP | 58047352 | | 3/1983 | |
| JP | 59157738 | | 9/1984 | |
| JP | 60110059 | | 6/1985 | |

OTHER PUBLICATIONS

"110 baud serial interface," Magga, W.S., *New Electronics*, vol. 18, No. 18, p. 29, abstract only, Sep. 17, 1985.

"A mass–termination, filtered connector for RS–232–C circuits," Whittaker, B.F., *Thirteenth Annual Connector Symposium Proceedings*, pp. 197–204, abstract only, 1980.

"A parallel–to–serial printer port adapter," Austerlitz, H., *BYTE*, vol. 10, No. 9, pp. 257–260, abstract only, Sep. 1985.

(List continued on next page.)

*Primary Examiner*—Fritz M. Fleming

(57) ABSTRACT

A configurable connector between two or more devices with at least one of the devices being capable of programming the connector through an interface therewith. The connector contains programmable electronic circuitry capable of being instructed by the device whereby the connector assumes a desired connecting configuration and/or function. In one embodiment the connector is programmed to inquire and determine the configuration of the device to which it is connected. With the results of its analysis the connector adapts the necessary timing, pin-outs, voltages, and other parameters to assure proper communication between the connected devices. In other embodiments the connector contains electronic components to add specific functions for data exchange, such as data buffering, data encryption and the like. In addition, the connector is programmable with interchangeable pin designations thereby obviating the need for rewiring for different applications and physical connections.

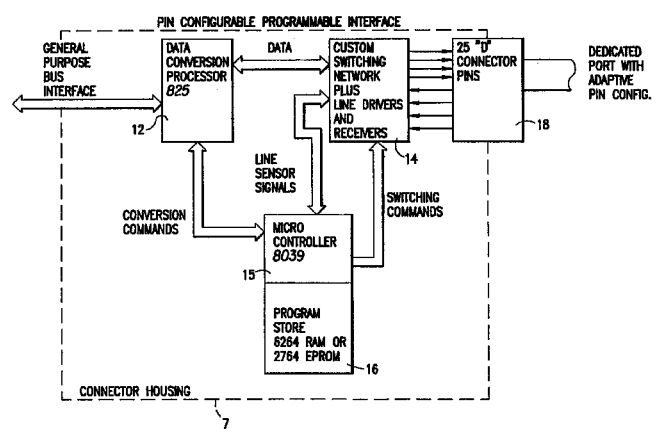

U.S. PATENT DOCUMENTS

Figure 1:
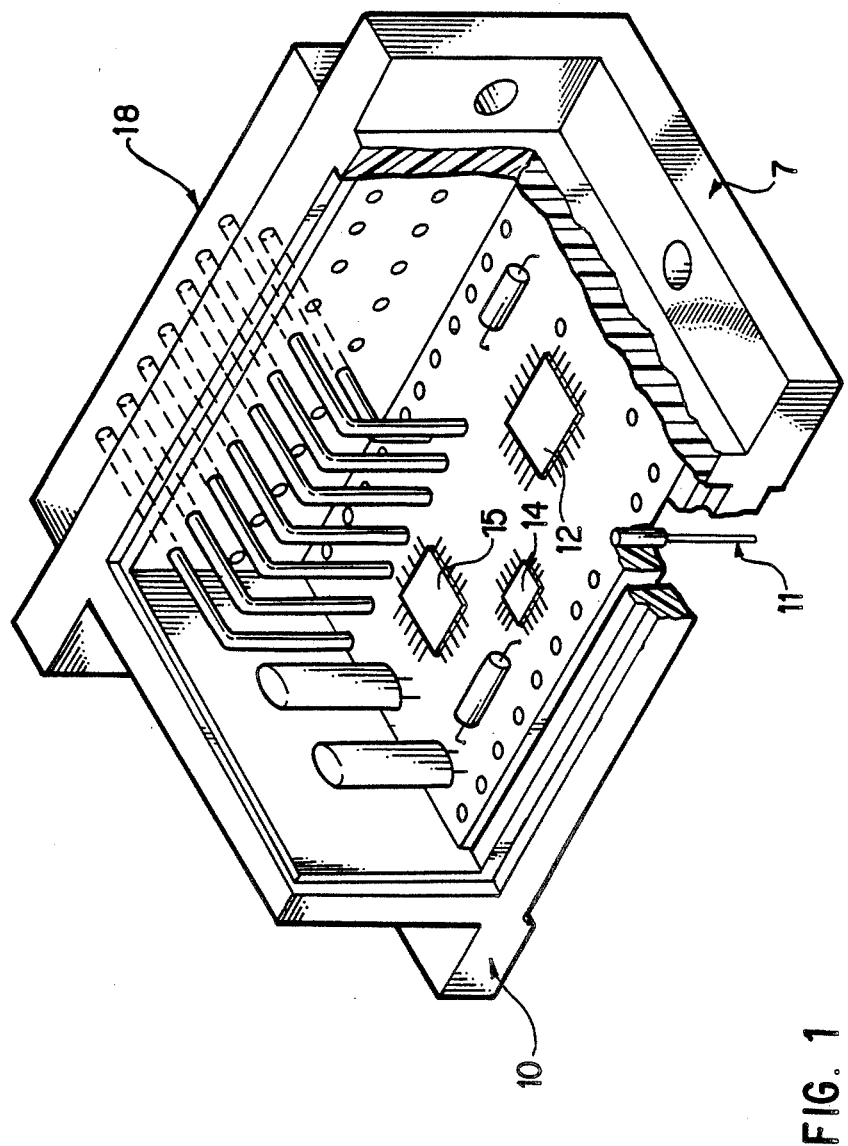
Figure 2:
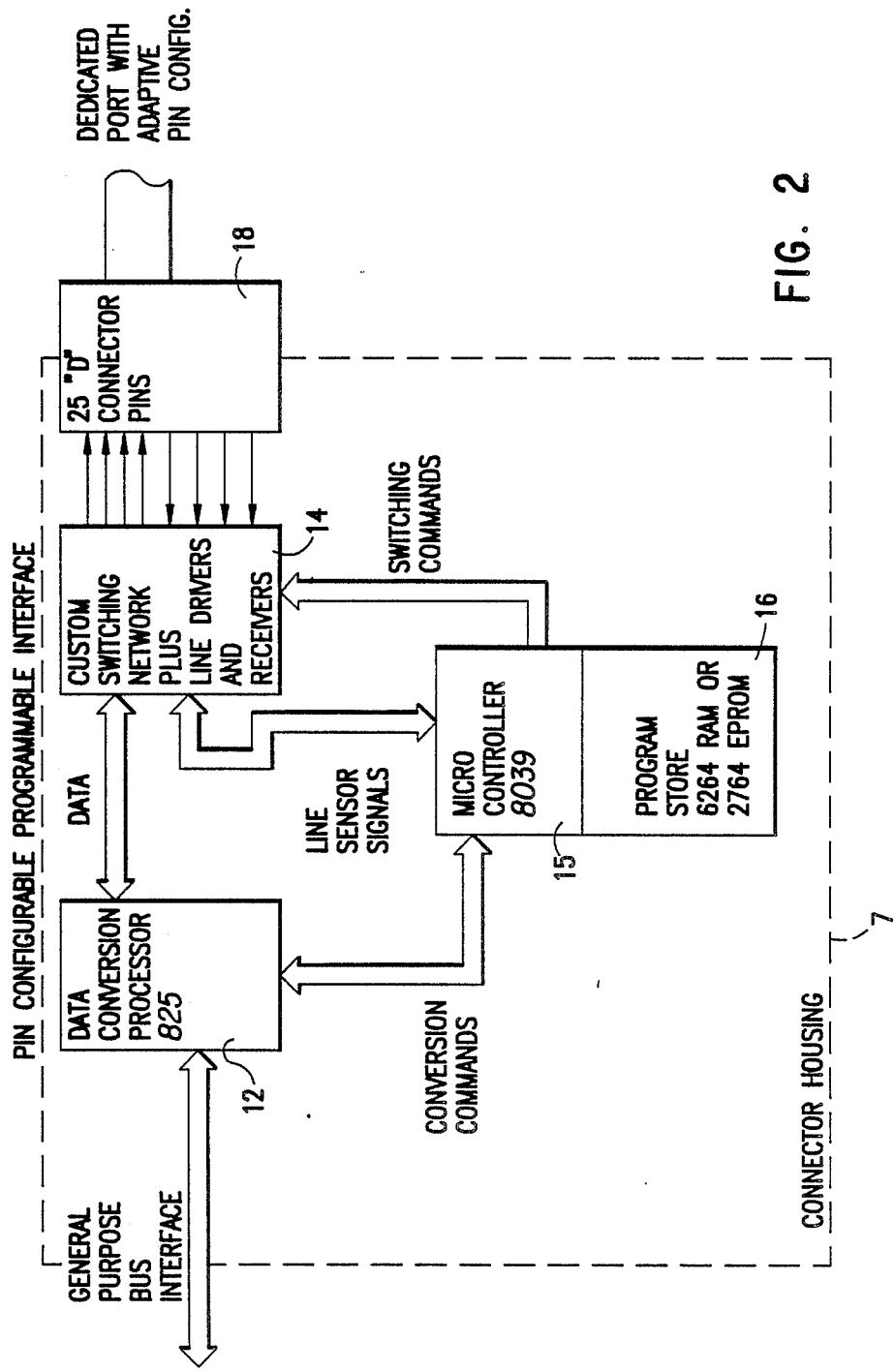
Figure 3A:
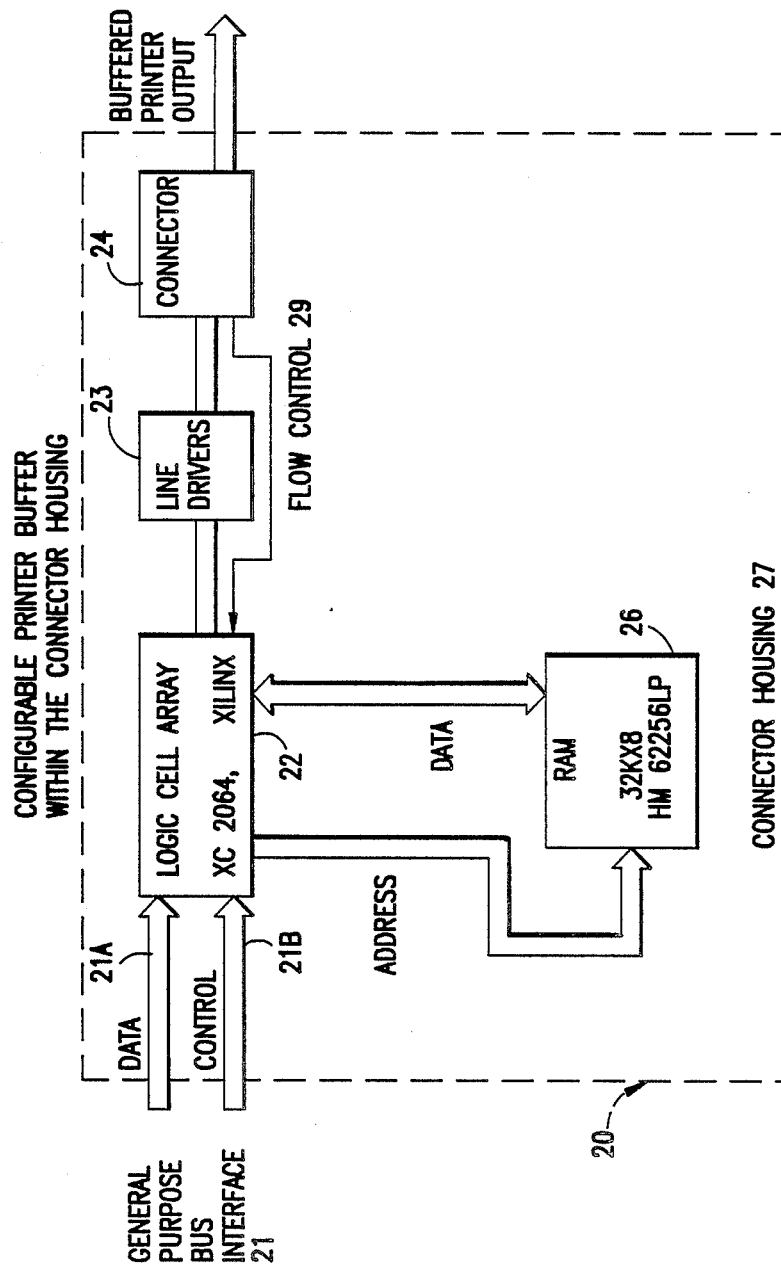
Figure 3B:
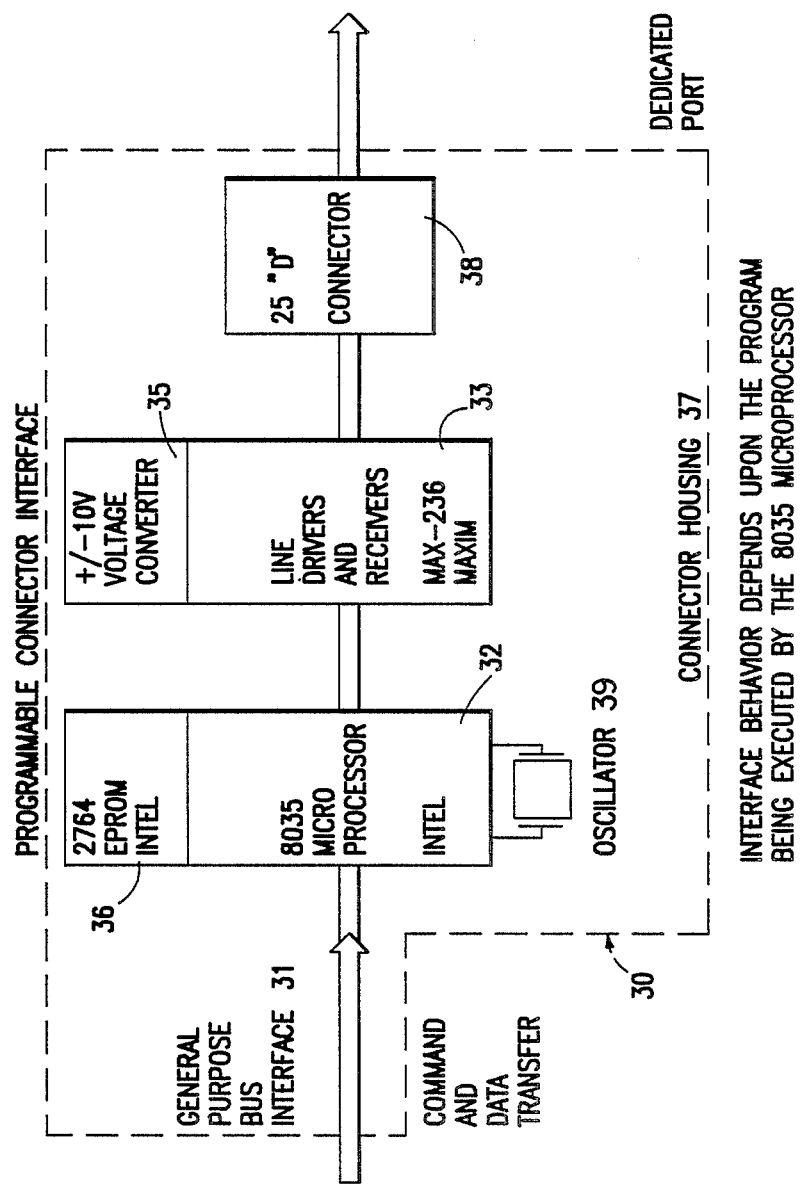

| Patent | Date | Inventor |
|---|---|---|
| 4,079,372 A | 3/1978 | Koenig |
| 4,115,849 A | 9/1978 | Johnson et al. |
| 4,115,856 A | 9/1978 | Labeye-Voisin et al. |
| 4,124,888 A | 11/1978 | Washburn |
| 4,124,889 A | 11/1978 | Kaufman et al. |
| 4,127,896 A | 11/1978 | Raslavsky, III |
| 4,137,559 A | 1/1979 | Reuting |
| 4,150,438 A | 4/1979 | Dorey et al. |
| 4,152,750 A | 5/1979 | Bremenour et al. |
| 4,181,933 A | 1/1980 | Benysek |
| 4,209,841 A | 6/1980 | Bambara et al. |
| 4,217,624 A | 8/1980 | Tuck |
| 4,242,721 A | 12/1980 | Krolak et al. |
| 4,245,300 A | 1/1981 | Kaufman et al. |
| 4,246,637 A | 1/1981 | Brown et al. |
| 4,250,407 A | 2/1981 | Dorey et al. |
| 4,250,563 A | 2/1981 | Struger |
| 4,253,143 A | 2/1981 | Onodera et al. |
| 4,253,146 A | 2/1981 | Bellamy et al. |
| 4,254,462 A | 3/1981 | Raymond et al. |
| 4,261,035 A | 4/1981 | Raymond |
| 4,271,518 A * | 6/1981 | Birzele et al. ............... 714/781 |
| 4,275,455 A | 6/1981 | Bartlett |
| 4,277,646 A | 7/1981 | Sams |
| 4,281,315 A * | 7/1981 | Bauer et al. ........... 340/825.52 |
| 4,293,924 A | 10/1981 | Struger et al. |
| 4,309,754 A | 1/1982 | Dinwiddie, Jr. |
| 4,315,308 A | 2/1982 | Jackson |
| 4,328,484 A | 5/1982 | Denecke |
| 4,333,696 A | 6/1982 | O'Neill et al. |
| 4,348,636 A | 9/1982 | Doundoulakis |
| 4,349,870 A * | 9/1982 | Shaw et al. .................... 712/38 |
| 4,350,973 A | 9/1982 | Petryk, Jr. |
| 4,354,268 A | 10/1982 | Michel et al. |
| 4,361,955 A | 12/1982 | Lancaster |
| 4,367,374 A | 1/1983 | Serrano |
| 4,375,103 A | 2/1983 | Arneth et al. |
| 4,395,610 A | 7/1983 | Downs et al. |
| 4,398,780 A | 8/1983 | Novotny et al. |
| 4,401,351 A | 8/1983 | Record |
| 4,403,111 A | 9/1983 | Kelly |
| 4,404,651 A | 9/1983 | Grudowski |
| 4,409,587 A | 10/1983 | Scott |
| 4,426,166 A | 1/1984 | Bowling |
| 4,428,043 A | 1/1984 | Catiller et al. |
| 4,428,044 A | 1/1984 | Liron |
| 4,432,604 A | 2/1984 | Schwab |
| 4,434,472 A | 2/1984 | Kachun |
| 4,443,850 A | 4/1984 | Harris |
| 4,443,865 A | 4/1984 | Schultz et al. |
| 4,443,884 A | 4/1984 | Swarz |
| 4,445,213 A | 4/1984 | Baugh et al. |
| 4,445,215 A | 4/1984 | Svendsen |
| 4,447,804 A | 5/1984 | Allen |
| 4,451,884 A | 5/1984 | Heath et al. |
| 4,463,421 A | 7/1984 | Laws |
| 4,477,862 A | 10/1984 | Gonzales |
| 4,480,885 A | 11/1984 | Coppelman |
| 4,485,439 A * | 11/1984 | Rothstein .................... 710/63 |
| 4,489,419 A | 12/1984 | Wang |
| 4,490,775 A | 12/1984 | Quan |
| 4,493,028 A | 1/1985 | Heath |
| 4,498,716 A | 2/1985 | Ward |
| 4,509,113 A | 4/1985 | Heath |
| 4,514,823 A | 4/1985 | Mendelson et al. |
| 4,516,173 A | 5/1985 | Abe et al. |
| 4,525,802 A | 7/1985 | Hackamack |
| 4,534,011 A | 8/1985 | Andrews et al. |
| 4,543,450 A | 9/1985 | Brandt |
| 4,556,953 A | 12/1985 | Caprio et al. |
| 4,571,456 A | 2/1986 | Paulsen et al. |
| 4,579,407 A | 4/1986 | Shimada |
| 4,582,324 A * | 4/1986 | Koza et al. ................... 463/16 |
| 4,593,959 A | 6/1986 | Simms |
| 4,597,631 A | 7/1986 | Flores |
| 4,603,320 A | 7/1986 | Farago |
| 4,607,170 A | 8/1986 | Wickman |
| 4,607,379 A | 8/1986 | Marshall, Jr. et al. |
| 4,630,198 A * | 12/1986 | I-Yuan ....................... 711/118 |
| 4,633,489 A | 12/1986 | Morishita |
| 4,639,863 A | 1/1987 | Harrison et al. |
| 4,641,263 A | 2/1987 | Perlman et al. |
| 4,670,855 A | 6/1987 | Caprio et al. |
| 4,683,550 A | 7/1987 | Jindrick et al. |
| 4,688,170 A * | 8/1987 | Waite et al. .................. 703/27 |
| 4,689,023 A | 8/1987 | Strong, III et al. |
| 4,691,350 A | 9/1987 | Kleijne et al. |
| 4,691,355 A | 9/1987 | Wirstrom et al. |
| 4,694,492 A | 9/1987 | Wirstrom et al. |
| 4,703,198 A | 10/1987 | Porter et al. |
| 4,723,195 A | 2/1988 | Mizzi et al. |
| 4,742,477 A | 5/1988 | Phillips et al. |
| 4,744,006 A | 5/1988 | Duffield |
| 4,749,362 A | 6/1988 | Hoffman et al. |
| 4,761,768 A * | 8/1988 | Turner et al. .......... 365/185.22 |
| 4,771,378 A | 9/1988 | Halford |
| 4,780,883 A | 10/1988 | O'Connor et al. |
| 4,847,863 A | 7/1989 | Watson |
| 4,852,041 A | 7/1989 | Nakano |
| 4,898,547 A | 2/1990 | Bottoms et al. |

OTHER PUBLICATIONS

"A shielded computer interface connector," Hodgetts, M.A., *Fourteenth Annual Connectors and Interconnections Symposium Proceedings*, pp. 113–118, abstract only, 1981.

"An RS232 to centronics–converter," *Practical Electronics*, vol. 21, No. 9, pp. 46–49, abstract only, Sep., 1985.

"Chips Inside Connector Cut Costs, Save Space," Electronics, pp. 25, abstract only, Jan. 13, 1986.

"Give your computer an RS–232C interface," Rowe, J., *Electronics Australia*, vol. 41, No. 9, pp. 81, 83–84, 139, abstract only, 1979.

"Interfacing for data acquisition," Clune, T.R., *BYTE*, vol. 10, No. 2, pp. 269–282, abstract only, Feb. 1985.

"Low–cost parallel to serial converter," Gareb, R., *Electronics Australia*, vol. 45, No. 7, pp. 96–99, abstract only, Jul. 1983.

"Making a DIN about connections (S5/8 serial interface)," Hardie, A; Chapman, P., *Computing, The Magazine*, p. 23, abstract only, Oct. 18, 1984.

"Modern Survey," Datamation, vol. 25, No. 3, pp. 167–226, abstract only, Mar. 1979.

"Modems," Which Computer?, pp. 131–141, abstract only, Sep. 1985.

"Modems—Integral Approach Gains Momentum," Goldman Norman, Data Communications User, pp. 31, abstract only, Dec. 1975.

"Operating Note model 15104A 15115 A 15116A," Hewlett Packard, Inc., 1982.

"Parallel to serial converter," Penfold, R.A., *Practical Electronics*, vol. 20, No. 9, pp. 17–20, abstract only, Sep. 1984.

"RS232/Centronics converter," *Elektor*, vol. 10, No. 10, pp. 58–63, abstract only, Oct. 1984.

"Serial to parallel—a flexible utility box," Wilcox, A.D., *Dr. Dobb's Journal*, vol. 8, No. 8 pp. 28–35, abstract only, Aug. 1983.

"Something Substantial: The Access Matrix Transportable Computer," Bassett, S.B., Small Business Computers Magazine, vol. 7, No. 4, pp. 42–45, abstract only, Oct. 1983.

"The Business Computer Network Corp has introduced the 'Network Inquirer,' a handheld computer that enables users to access hundreds of public databases by selecting the network desired from a list and pressing an appropriate selection number," Magazine of Direct Marketing, pp. 1291, abstract only, Nov. 1982.

"The microcomputer RS232C interface system," Malcome–Lawes, D.J., *Laboratory Microcomputer,* vol. 3, No. 3, pp. 89–100, abstract only, 1984.

"The modem for the house telephone," HC Mein Home Computer, No. 9, pp. 36–42, abstract only, Sep. 1984.

"The standard interface," Repko, M., *Systems International,* vol. 9, No. 6, pp. 40–42, abstract only, Jun. 1981.

"UART forms RS–232C/Centronics interface," Perianayagam, K.S., Kalyanaramudu, United Kingdom, *EDN,* vol. 30, No. 27, pp. 263–264, abstract only, Dec. 12, 1985.

"Universal RS232C cable," Vaidya, D.M., *Microprocessors and Microsystems,* vol. 9, No. 5, pp. 231–233, abstract only, Jun. 1985.

"Universal VDU interface," Polecat, H., *Electronic Product Design,* vol. 2, No. 2, p. 23, abstract only, Feb. 1981.

"Vic–20 The friendly computer VICMODEM," Commodore Business Machines, Inc. copyright 1982.

"You Can Take It with You," Smith, Amy E., Business Computer Systems, vol. 1, No. 1, pp. 94–99, abstract only, Sep. 1981.

National Semiconductor PC1645OC/NS16450, PC8250A/INS8250A, Universal Asynchronous Receiver/Transmitter, Jul. 1990.

Martin S. Michael, A Comparison of the INS8250, NS16450 and NS16550AF Series of UARTs, National Semiconductor Application Note 493, Apr. 1989.

Radio Shack TRS–80 Color Computer Disk System Owner's Manual and Programming Guide, Copyright 1981.

Radio Shack Service Manual TRS–80 Color Computer Disk Interface Catalog No. 26–3022, 1/82.

Radio Shack TRS–80 Micro Computer System Expansion Interface Catalog No. 26–1140/1141/1142, Copyright 1979.

Radio Shack TRS–80 Hardware TRS–80 RS–232–C Interface Catalog No. 26–1145, no date provided.

Hewlett–Packard HP 82938A HP–IL Interface Owner's Manual Series 80, Jan. 1982.

* cited by examiner

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1–13 is confirmed.

\* \* \* \* \*